United States Patent Office 3,205,039
Patented Sept. 7, 1965

3,205,039
PRODUCTION OF METHACRYLIC ACID AND AMMONIUM BISULFATE
Ludwig Hüter and Ulrich Reichau, Frankfurt am Main, and Karl Rinn, Darmstadt, Germany, assignors to Deutsche Gold- und Silber-Scheideanstalt vormals Roessler, Frankfurt am Main, Germany
No Drawing. Filed Jan. 24, 1962, Ser. No. 168,543
Claims priority, application Germany, Jan. 30, 1961, D 35,297
4 Claims. (Cl. 23—119)

The present invention relates to an improved process for the simultaneous production of methacrylic acid and ammonium bisulfate in practically water free state from the hydrolysation reaction mixture of methacrylamide-sulfate and water.

It is known that methacrylic acid can be produced by hydrolysing the so-called methacrylamide sulfate (Ullmanns, Encyclopedia of Technical Chemistry, 3rd Ed., vol. 12, page 392, Munich, 1960). As the chemical nature of the so-called methacrylamide-sulfate does not as yet seem fully certain, the term "methacrylamide-sulfate" is used herein to designate a heat treated homogeneous reaction mixture from acetone cyanhydrin and concentrated, as nearly 100% as possible, sulfuric acid. See, for example, U.S. Patents Nos. 2,042,458, 2,140,469 and 2,628,977. The molar ratio of both components of the mixture in equivalent mixtures is 1:1.

It has become known through German Patent No. 863,050 and British Patent No. 650,343 that methacrylamide-sulfate can be hydrolysed with a large excess of water (about 10 mol) and more by heating the mixture to its boiling point for a number of hours (usually 4–5). Such procedure results in the production of aqueous methacrylic acid solutions of about 50% concentration which also contain varying quantities of ammonium bisulfate and sulfuric acid and from which, depending upon the salt concentration at hand, the methacrylic acid can only be separated incompletely by phase separation. In such processes it is, therefore, necessary to improve the separation of the methacrylic acid by additional neutralization or addition of salts to increase the salting out effect. The methacrylic acid is subsequently usually separated off by distallation and extracted from the distillate with suited solvents. Despite the many variations of this process the yields of methacrylic acid obtained are considered technically unsatisfactory.

It is believed that the unsatisfactory yields of these processes primarly can be traced back to the longer heating of the aqueous methacrylamide-sulfate mixture to temperatures around 90° C. whereby, despite stabilization of the strongly acid hydrolysation mixtures, partial polymerization of the methacrylic acid, the formation of α-hydroxy acids or their amides and irreversible decomposition of the α-hydroxy acids takes place. A further difficulty in processes of this type is in the processing of the resulting aqueous sulfuric acid containing ammonium salt solutions from which the solid salts cannot be recovered without special measures as they are strongly contaminated with the above mentioned decomposition and conversion products of methacrylic acid.

According to the invention it was unexpectedly found that methacrylic acid and ammonium bisulfate can be obtained simultaneously by treatment of the so-called methacrylamide-sulfate with water if the methacrylamide-sulfate is treated with 1–1.3 mol of water in liquid or vapor form per mol of methacrylamide-sulfate at temperatures over 125° C., if necessary under pressure, and separating the resulting practically water free phases of melted ammonium bisulfate and methacrylic acid. In the use of only approximately stoichiometric quantities of water which just suffice for the hydrolysis or are only in slight excess practically water free products are obtained in contradistinction to the aqueous solution of the prior processes. The use of temperatures above 120° C. diminishes the time required for the quantitative hydrolysis to one hour or even to several minutes.

The initiation of the hydrolysis occurring in the process according to the invention first becomes noticeable by a clouding of the reaction mixtures caused by the melted ammonium bisulfate which separates out. During the course of the reaction and depending upon the intensity of the mechanical mixing of the reaction mixture, the melted ammonium bisulfate separates off as the specifically heavier layer and solidifies after completion of the separation of the layers very rapidly to a white crystalline block when the mixture cools off below 120° C. The solidification of the melted ammonium bisulfate can be lengthened out if one uses about 1.1–1.3 mol of water per mol of methacrylamide-sulfate to be hydrolysed. It, however, is expedient to separate the layers from each other when the reaction mixture still has a temperature above 125° C. and then let the ammonium bisulfate layer crystallize after separation from the organic layer. The upper organic layer consists of almost pure and practically water free methacrylic acid. It is contaminated with only small quantities of methacrylamide-sulfate and can be processed to pure methacrylic acid in a known manner.

The range of temperatures at which the process according to the invention is carried out lies between about 125° C. and 185° C. When reaction temperatures are employed which lie somewhat above 145° C. it is necessary to operate under pressure in order to retain the quantity of water required for the hydrolysis in the reaction mixture. In the range of 125–145° C. the hydrolysis, however, also can be carried out at atmospheric pressure by heating under reflux. It is necessary, however, in this instance to mix the reaction mixture intensively and to provide for a good distribution of the water in the reaction mixture or alternately to use an excess of water as with incomplete mixing spontaneous vaporization of the reflux water takes place at the surface of the reaction mixture and a certain amount of water is withheld from the reaction mixture by the reflux cooling system. It furthermore is also possible to supply the water required for the hydroylsis to the reaction mixture in the form of steam. To a certain extent this is advantageous as the steam which is metered into the reaction mixture is immediately used up in the hydrolysation reaction.

When the process is carried out under pressure at temperatures between 145 and 185° C., preferably between 160 and 170° C., pressures of 2–10 atmospheres are expediently employed. When operating under pressure it is advantageous to use only the quantity of water required for the hydrolysis, that is, about 1 mol of water per mol of methacrylamide-sulfate to be hydrolysed. In carrying out the reaction under pressure the components can be heated in the normal manner in an autoclave to the preferred temperatures. Expediently, however, a pressure flow tube is employed which contains nitrogen under pressure into which the components are metered in and are heated up to the reaction temperature while flowing through the tube. This embodiment of the process renders it possible to carry it out easily in a continuous manner.

In the event that it is necessary to purify the molten or solidified ammonium bisulfate produced further, for example, to melting point purity, it is expedient to extract the hot liquid bisulfate with an organic solvent. This procedure removes the small quantities of methacrylic acid entrained by the bisulfate. Ketones such as acetone, ethyl methyl ketone, methyl isobutylketone and the like, as well as hydrocarbons, especially aliphatic hydrocarbons, especially in admixture with the above mentioned ketones, are particularly suited as solvents for such purification. When the solvents employed have a boiling point below the melting point of the ammonium bisulfate, the extraction is carried out under a correspondingly higher pressure.

The following Table I illustrates the velocity of hydrolysis of a mixture of methacrylamide sulfate and water in a molar ratio of 1:1.1 at a temperature of 135° C. In such table, the quantities of ammonium bisulfate formed in percent of the theoretical are given as indications of the degree of hydrolysis attained. The initiation of the hydrolysis in the test according to Table I was discernible already after 7½ minutes by the milky clouding of the originally fully clear water white reaction mixture.

TABLE I

| Minutes: | $NH_4HSO_4$ percent of the theoretical |
|---|---|
| 10 | 14.0 |
| 20 | 57.8 |
| 30 | 77.0 |
| 40 | 87.5 |
| 50 | 93.2 |
| 60 | 98.7 |
| 70 | 98.68 |

The velocity of hydrolysation, of course, also is dependent upon the temperature employed as can be seen from the following Table II. In this table the results of test concerning the velocity of hydrolysis of mixtures of methacrylamide-sulfate and water (of a molar ratio of 1:1.1 when temperatures up to 145° C. were employed and of 1:1 when temperatures above 145° C. were employed) were compared with the times when a maximum separation of ammonium bisulfate was achieved.

TABLE II

| °C. | Minutes | $NH_4HSO_4$ as $NH_4HSO_4$ | Percent of the theoretical as methacrylamide |
|---|---|---|---|
| 125 | 110 | 99.2 | 1.5 |
| 135 | 60 | 98.70 | 2.85 |
| 145 | 32 | 98.35 | 2.90 |
| 155 | 16 | 99.0 | 0.3 |
| 165 | 7 | 99.52 | -------- |
| 175 | 4 | 98.8 | -------- |

In the following Table III the dependency of the velocity of hydrolysation upon the ratio of methacrylamide-sulfate to water in the reaction mixture is indicated by the time required for maximum formation of bisulfate. The distribution of the ammonium bisulfate in the layers formed under these conditions is also given. The hydrolysis was carried out at 135° C. at atmospheric pressure.

TABLE III

| Molar ratio methacrylamide sulfate to water | Minutes | $NH_4HSO_4$ percent of the theoretical— | | |
|---|---|---|---|---|
| | | Total | As amide | In the inorganic phase |
| 1:1.1 | 60 | 98.7 | 2.85 | 97.2 |
| 1:1.5 | 40 | 97.0 | 1.5 | 78.0 |
| 1:1.7 | 30 | 98.8 | -------- | 76.3 |
| 1:2.0 | 20 | 97.9 | 0.5 | 74.0 |

It is noteworthy that the best yield and the best phase separation is obtained when using about 1 mol of water perthmol of methacrylamide-sulfate. It nevertheless is advantageous to employ a slightly greater quantity of water, about 1.1 mol instead of exactly 1 mol, as with this composition the ammonium bisulfate which separates out does not crystallize as rapidly and is less disturbing to the operation, particularly when it is carried out in a pressure flow tube.

The considerably shorter reaction periods required for the process according to the invention provide a decided advantage over the previously known procedures. Such shorter reaction periods render the process particularly adapted for continuous operation, for example, in pressure flow tubes. In contrast to the previously known processes, the reaction products, methacrylic acid and ammonium bisulfate, are obtained practically water free in excellent yields and without noteworthy contamination with by-products. As a consequence the methacrylic acid produced according to the invention has little tendency to polymerize and has good stability upon storage. The practically water free methacrylic acid produced in addition can be purified of distillates without addition of stabilizers or solvents. The substantially complete separation of both phases produced renders it possible to utilize the ammonium bisulfate produced in the hydrolysation industrially without further purification. No costs for dehydration or concentration are entailed.

The following examples will serve to illustrate the process according to the invention.

*Example 1*

747 g. of a 1:1 molar mixture of acetone-cyanhydrin and sulfuric acid which had been after reacted in a subsequent heat treatment (=4.08 mol methacrylamide-sulfate) were placed in a 1 liter flask provided with a reflux condenser and 81 g. of water (=4.5 mol), providing a molar ratio of methacrylamide-sulfate to water of 1:1.1, reacted therewith while maintaining the flask at a temperature of 135° C. The 0.4 mol water excess was employed as at the temperature maintained in the flask a portion of the water is taken up by the reflux and therefore withdrawn from the reaction. Furthermore, the presence of a quantity of excess water of this order in addition reduced the melting point of the bisulfate phase (146.9° C.) to about 130° C. and thereby facilitated the processing.

After 60 minutes the phase separation was effected in a heated separator. After cooling the inorganic phase solidified to a solid white fused cake weighing 480 g. The weight of the organic phase, which was a light yellow oily liquid was 344 g. This represented a 4 g. loss (corresponding to 0.55%) based upon the reactants supplied. Upon processing and analysis the following distribution of the reaction products in the phases was found:

|  | Inorganic Phase | | | Organic Phase | | | Total percent of theoretical |
|---|---|---|---|---|---|---|---|
|  | g. | Percent by wt. | Percent of theo. | g. | Percent by wt. | Percent of theo. |  |
| As HN$_4$HSO$_4$ | 457.6 | 95.8 | 97.3 | 6.1 | 1.78 | 1.3 | 98.6 |
| Amide | 3.9 | 0.82 | 1.12 | 5.99 | 1.75 | 1.73 | 2.85 |
| Excess H$_2$O | 5.28 | 1.11 | 70.4 | 2.64 | 0.77 | 35.2 | 105.2 |
| Methacrylic acid | 7.5 | 1.57 | 2.14 | 328.75 | 95.7 | 93.7 | 95.84 |
| Polymeric methacrylic acid | 3.0 | ca. 0.63 | 0.86 |  |  |  | 0.86 |
|  | 447.28=100% |  | 99.3 | 343.48=100% |  | 99.8 |  |

*Example 2*

751 g. of a 1:1 molar mixture of acetone-cyanhydrin and sulfuric acid which had been after reacted in a subsequent heat treatment (=4.11 mol of methacrylamide-sulfate) were reacted with 81.3 g. of water (=4.54 mol), providing a molar ratio of methacrylamide-sulfate to water of 1:1.1, in an apparatus as in Example 1 while maintaining a flask temperature of 125° C. The test was terminated after 10 minutes. On processing the reaction mixture 486 g. of inorganic phase were recovered as a solid white fused cake and 341 g. of organic phase as a yellow thin oil. The losses on the walls of the apparatus were 5.3 g. or 0.64%. Processing and analysis gave the following distribution of the reaction products between the phases.

|  | Inorganic Phase | | | Organic Phase | | | Total percent of theoretical |
|---|---|---|---|---|---|---|---|
|  | g. | Percent by wt. | Percent of theo. | g. | Percent by wt. | Percent of theo. |  |
| As NH$_4$HSO$_4$ | 462 | 95.5 | 97.8 | 7.1 | 2.09 | 1.5 | 99.2 |
| Amide | 1.64 | 0.34 | 0.47 | 3.6 | 1.06 | 1.03 | 1.5 |
| Excess H$_2$O | 5.17 | 1.07 | 69.0 | 2.35 | 0.69 | 31.3 | 100.3 |
| Methacrylic acid | 6.93 | 1.43 | 1.96 | 326.5 | 96.2 | 92.4 | 94.36 |
| Polymeric methacrylic acid | 8.3 | 1.72 | 2.49 |  |  |  | 2.49 |
|  | 484.04=100% |  | 99.5 | 339.55=100% |  | 99.4 |  |

*Example 3*

2500 cc. (=1770 g.=9.66 mol) per hour of methacrylamide-sulfate, molar ratio 1:1, and 174 g. (=9.66 mol) of water were simultaneously metered over stainless steel (V4A) metering pumps having a heated head and a heated main block of the same material through a coil also of the same material having a useful volume of 300 cc. to which a heated separator also of the same material was attached. The pump head for the methacrylamide-sulfate was heated to 110° C. and that for the water to 60° C. The reaction space in the stainless steel coil was maintained at 165° C. with the aid of a heating bath. A nitrogen gas pressure of 5–10 atmospheres gauge pressure was maintained in the system. At the rate of supply of the reaction components employed the average time of stay in the stainless steel coil was 6.7 to 7 minutes. The organic and inorganic phases were continuously withdrawn from the heated separator. The inorganic phase solidified in the receiver pan into a snow white crystalline plate whereas the organic layer flowed off over a cooler as a light yellow oil. Processing and analysis gave the following values per hour: Inorganic layer =1110 g. organic layer=827 g. This corresponded to a 7 g. loss, based upon input, corresponding to 0.36%.

|  | Inorganic Phase | | | Organic Phase | | | Total percent of theoretical |
|---|---|---|---|---|---|---|---|
|  | g. | Percent by wt. | Percent of theo. | g. | Percent by wt. | Percent of theo. |  |
| As NH$_4$HSO$_4$ | 1101 | 99.7 | 98.94 | 6.5 | 0.8 | 0.58 | 99.52 |
| Amide | 0.2 |  |  | 0.8 |  |  | 0.1 |
| H$_2$O |  |  |  | 0.32 |  |  |  |
| Methacrylic acid |  |  |  | 815.0 | 99.1 | 98.1 | 98.1 |
| Polymeric methacrylic acid | 2.5 | 0.25 | 0.3 |  |  |  | 0.3 |
|  | 1103.7 | = | 99.43 | 822.62 | = | 99.47 |  |

According to the present invention the best results are obtained when a methacrylamide-sulfate/water ratio is used which preferably lies within the range of 1:1.0 and 1:1.1 mol.

What is claimed:

1. A process for the production of methacrylic acid and ammonium bisulfate which comprises reacting methacrylamide-sulfate, obtained as the heat treated reaction product of a 1:1 molar mixture of acetone cyanhydrin and sulfuric acid, with 1–1.1 mol of water per mol of metahacrylamide-sulfate at a temperature between 125 and 185° C. and separating the resulting practically water free phases of melted ammonium bisulfate and methacrylic acid.

2. The process of claim 1 in which said reaction is carried out at a temperature between 160 and 170° C. under a pressure of about 2 to 10 atmospheres.

3. The process of claim 1 in which said reaction is carried out at a temperature between 125 and 145° C. and the molar ratio of methacrylamide-sulfate to water is 1:1.1.

4. The process of claim 1 in which the separation of the practically water free phases is carried out at a temperature above 120° C.

References Cited by the Examiner

UNITED STATES PATENTS 2,140,469  12/38  Crawford et al. _____ 260—526

FOREIGN PATENTS 477,203  9/51  Canada.

MAURICE A. BRINDISI, *Primary Examiner.*